United States Patent
Kim et al.

(10) Patent No.: US 10,250,079 B2
(45) Date of Patent: Apr. 2, 2019

(54) METHOD AND APPARATUS FOR WIRELESSLY TRANSMITTING POWER AND POWER TRANSMISSION INFORMATION

(71) Applicant: SAMSUNG ELECTRONICS CO., LTD., Suwon-si (KR)

(72) Inventors: Nam Yun Kim, Seoul (KR); Sang Wook Kwon, Seongnam-si (KR); Hyuk Choon Kwon, Seoul (KR); Bong Chul Kim, Seoul (KR); Yun Kwon Park, Dongducheon-si (KR); Jae Hyun Park, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 17 days.

(21) Appl. No.: 15/484,203

(22) Filed: Apr. 11, 2017

(65) Prior Publication Data
US 2017/0222471 A1 Aug. 3, 2017

Related U.S. Application Data

(63) Continuation of application No. 14/338,214, filed on Jul. 22, 2014, now Pat. No. 9,641,017.

(30) Foreign Application Priority Data

Jul. 22, 2013 (KR) .......................... 10-2013-0086337

(51) Int. Cl.
*H02J 7/00* (2006.01)
*H02J 50/40* (2016.01)
(Continued)

(52) U.S. Cl.
CPC .............. *H02J 50/40* (2016.02); *H02J 17/00* (2013.01); *H02J 50/12* (2016.02); *H02J 50/80* (2016.02)

(58) Field of Classification Search
CPC ........ H02J 7/025; H01F 38/14; Y02T 90/122; B60L 11/182; Y02E 60/12
(Continued)

(56) References Cited

U.S. PATENT DOCUMENTS 5,600,225 A * 2/1997 Goto ..................... H02J 7/0004
                                                320/108
8,344,688 B2 * 1/2013 Yoda ....................... H02J 7/025
                                                320/107
(Continued)

FOREIGN PATENT DOCUMENTS

KR   10-2013-0073862 A    7/2013

*Primary Examiner* — Arun C Williams
(74) *Attorney, Agent, or Firm* — Sughrue Mion, PLLC

(57) ABSTRACT

A method of operating a wireless power transmission apparatus includes receiving, from a wireless power reception apparatus, information on an operating power of a micro control unit (MCU) of the wireless power reception apparatus and information on an output of a direct current-to-direct current (DC/DC) converter of the wireless power reception apparatus; determining whether a charging power is to be transmitted to the wireless power reception apparatus based on the received information on the output of DC/DC converter; and transmitting, to the wireless power reception apparatus, an MCU operating power calculated based on the received information on the operating power of the MCU in response to a determination that the charging power is not to be transmitted to the wireless power reception apparatus.

9 Claims, 14 Drawing Sheets

(51) Int. Cl.
*H02J 50/80* (2016.01)
*H02J 50/12* (2016.01)
*H02J 17/00* (2006.01)

(58) Field of Classification Search
USPC ........................................................ 320/108
See application file for complete search history.

(56) References Cited

U.S. PATENT DOCUMENTS

| | | | |
|---|---|---|---|
| 9,018,904 B2* | 4/2015 | Seyerle | B60R 16/033 |
| | | | 320/113 |
| 2009/0224723 A1 | 9/2009 | Tanabe | |
| 2011/0109263 A1 | 5/2011 | Sakoda et al. | |
| 2011/0127952 A1 | 6/2011 | Walley et al. | |
| 2011/0127953 A1 | 6/2011 | Walley et al. | |
| 2011/0154087 A1 | 6/2011 | Craine | |
| 2012/0169275 A1* | 7/2012 | Lee | H02J 7/0042 |
| | | | 320/108 |
| 2012/0176085 A1 | 7/2012 | Iida et al. | |
| 2012/0212178 A1 | 8/2012 | Kim | |

* cited by examiner

METHOD AND APPARATUS FOR WIRELESSLY TRANSMITTING POWER AND POWER TRANSMISSION INFORMATION

CROSS-REFERENCE TO RELATED APPLICATIONS

This application is a Continuation of U.S. application Ser. No. 14/338,214, filed on Jul. 22, 2014, which claims the benefit of priority of Korean Patent Application No. 10-2013-0086337 filed on Jul. 22, 2013, which is incorporated by reference in their entirety.

BACKGROUND

1. Field

The following description relates to a method and an apparatus for transmitting a communication power in a wireless power transmission system.

2. Description of Related Art

Wireless power is energy that is transmitted from a power transmitting unit (PTU) to a power receiving unit (PRU) though magnetic coupling. A wireless power transmission system or a wireless power charging system includes a source device and a target device. The source device wirelessly transmits power, and the target device wirelessly receives power. The source device may be referred to as a source or a PTU, and the target device may be referred to as a target or a PRU.

The source device includes a source resonator, and the target device includes a target resonator. Magnetic coupling or resonant coupling occurs between the source resonator and the target resonator.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of operating a wireless power transmission apparatus includes receiving, from a wireless power reception apparatus, information on an operating power of a micro control unit (MCU) of the wireless power reception apparatus and information on an output of a direct current-to-direct current (DC/DC) converter of the wireless power reception apparatus; determining whether a charging power is to be transmitted to the wireless power reception apparatus based on the received information on the output of the DC/DC converter; and transmitting, to the wireless power reception apparatus, an MCU operating power calculated based on the received information on the operating power of the MCU in response to a determination that the charging power is not to be transmitted to the wireless power reception apparatus.

The wireless power reception apparatus may further include a battery and a battery charger; and the determining of whether the charging power is to be transmitted to the wireless power reception apparatus may further include receiving, from the wireless power reception apparatus, information on a battery supply voltage supplied to the battery; and determining whether the battery is completely charged by the battery charger based on the received information on the battery supply voltage.

The determining of whether the charging power is to be transmitted to the wireless power reception apparatus may further include determining that the charging power is not to be transmitted to the wireless power reception in response to a determination that the battery is completely charged by the battery charger.

The determining of whether the charging power is to be transmitted to the wireless power reception apparatus may further include receiving, from the wireless power reception apparatus, information regarding whether the wireless power reception apparatus is connected to an external power supply; determining whether the wireless power reception apparatus is connected to the external power supply based on the received information regarding whether the wireless power reception apparatus is connected to the external power supply; and determining that the charging power is not to be transmitted to the wireless power reception apparatus in response to a determination that the wireless power reception apparatus is connected to the external power supply.

The wireless power reception apparatus may further include a battery charging case including a battery charger; and the determining of whether the charging power is to be transmitted to the wireless power reception apparatus may further include receiving, from the wireless power reception apparatus, information on a battery supply voltage supplied to a battery; and determining whether the battery is completely charged by the battery charger based on the received information on the battery supply voltage.

The determining of whether the charging power is to be transmitted to the wireless power reception apparatus may further include determining that the charging power is not to be transmitted to the wireless power reception apparatus in response to a determination that the battery is completely charged by the battery charger.

The wireless power reception apparatus may further include a battery charging case including a battery charger; and the determining of whether the charging power is to be transmitted to the wireless power reception apparatus may further include receiving, from the wireless power reception apparatus, information on a battery supply voltage supplied to a battery; determining whether the battery is inserted in the battery charging case based on the received information on the battery supply voltage; and determining that the charging power is not to be transmitted to the wireless power reception apparatus in response to a determination that the battery is not inserted in the battery charging case.

In another general aspect, a method of operating a wireless power reception apparatus includes transmitting, to a wireless power transmission apparatus, information on an operating power of a micro control unit (MCU) of the wireless power reception apparatus and information on an output of a direct current-to-direct current (DC/DC) converter of the wireless power reception apparatus; and receiving a power from the wireless power transmission apparatus; wherein the received power is a power transmitted by the wireless power transmission apparatus in response to a result of determining, by the wireless power transmission apparatus, whether a charging power is to be transmitted to the wireless power reception apparatus based on the information on the output of the DC/DC converter transmitted to the wireless power transmission apparatus.

The wireless power reception apparatus may further include a battery and a battery charger; the method may further include transmitting, to the wireless power transmission apparatus, information on a battery supply voltage supplied to the battery; and the received power may be a power transmitted by the wireless power transmission apparatus in response to a result of determining, by the wireless power transmission apparatus, whether the battery is completely charged by the battery charger based on the information on the battery supply voltage transmitted to the wireless power transmission apparatus.

The wireless power reception apparatus may further include a battery charging case including a battery charger; the method may further include transmitting, to the wireless power transmission apparatus, information on a battery supply voltage supplied to a battery; and the received power may be a power transmitted by the wireless power transmission apparatus based on a result of determining, by the wireless power transmission apparatus, whether the battery is inserted in the battery charging case based on the information on the battery supply voltage transmitted to the wireless power transmission apparatus, and a result of determining, by the wireless power transmission apparatus, whether the battery is completely charged by the battery charger based on the information on the battery supply voltage transmitted to the wireless power transmission apparatus.

In another general aspect, a wireless power transmission apparatus includes a communication unit configured to receive, from a wireless power reception apparatus, information on an operating power of a micro control unit (MCU) of the wireless power reception apparatus and information on an output of a direct current-to-direct current (DC/DC) converter of the wireless power reception apparatus; a determiner configured to determine whether a charging power is to be transmitted to the wireless power reception apparatus based on the received information on the output of the DC/DC converter; and a resonator configured to transmit, to the wireless power reception apparatus, an MCU operating power calculated based on the information on the operating power of the MCU in response to a determination that the charging power is not to be transmitted to the wireless power reception apparatus.

The wireless power reception apparatus may further include a battery and a battery charger; the communication unit may be configured to receive, from the wireless power reception apparatus, information on a battery supply voltage supplied to the battery; and the determiner may be further configured to determine whether the battery is completely charged by the battery charger based on the received information on the battery supply voltage.

The wireless power reception apparatus may further include a battery charging case including a battery charger; the communication unit may be further configured to receive, from the wireless power reception apparatus, information on a battery supply voltage supplied to a battery; and the determiner may be further configured to determine whether the battery is inserted in the battery charging case based on the received information on the battery supply voltage, and determine whether the battery is completely charged by the battery charger based on the received information on the battery supply voltage.

In another general aspect, a method of operating a wireless power transmission apparatus includes receiving, from a wireless power reception apparatus, information on a power available to the wireless power reception apparatus; determining whether to transmit a communication power or a charging power to the wireless power reception apparatus based on the received information on the power available to the wireless power reception apparatus; and transmitting the determined one of the communication power and the charging power to the wireless power reception apparatus.

The communication power may be only enough power to enable the wireless power reception apparatus to communicate with the wireless power transmission apparatus; and the charging power may be enough power to enable the wireless power reception apparatus to perform all normal operations of the wireless power reception apparatus and charge a battery of the wireless power reception apparatus.

The information on the power available to the wireless power reception apparatus may further include any one or any combination of information on an output of a direct current-to-direct current (DC/DC) converter of the wireless power reception apparatus; information on a battery supply voltage supplied to a battery of the wireless power reception apparatus; and information regarding whether the wireless power reception apparatus is connected to the external power supply.

The method may further include receiving, from the wireless power reception apparatus, information on an operating power of a micro control unit (MCU) of the wireless power reception apparatus; and determining the communication power based on the received information on the operating power of the MCU.

The determining of whether to transmit a communication power or a charging power to the wireless power reception apparatus may include determining whether enough power is available to the wireless power reception apparatus to enable the wireless power reception apparatus to perform all normal operations of the wireless power reception apparatus and charge a battery of the wireless power reception apparatus based on the received information on the power available to the wireless power reception apparatus; determining to transmit the communication power to the wireless power reception apparatus based on a determination that enough power is available to the wireless power reception apparatus to enable the wireless power reception apparatus to perform all normal operations of the wireless power reception apparatus and charge a battery of the wireless power reception apparatus; and determining to transmit the charging power to the wireless power reception apparatus based on a determination that enough power is not available to the wireless power reception apparatus to enable the wireless power reception apparatus to perform all normal operations of the wireless power reception apparatus and charge a battery of the wireless power reception apparatus.

Other features and aspects will be apparent from the following detailed description, the drawings, and the claims.

DETAILED DESCRIPTION

Figure 1:
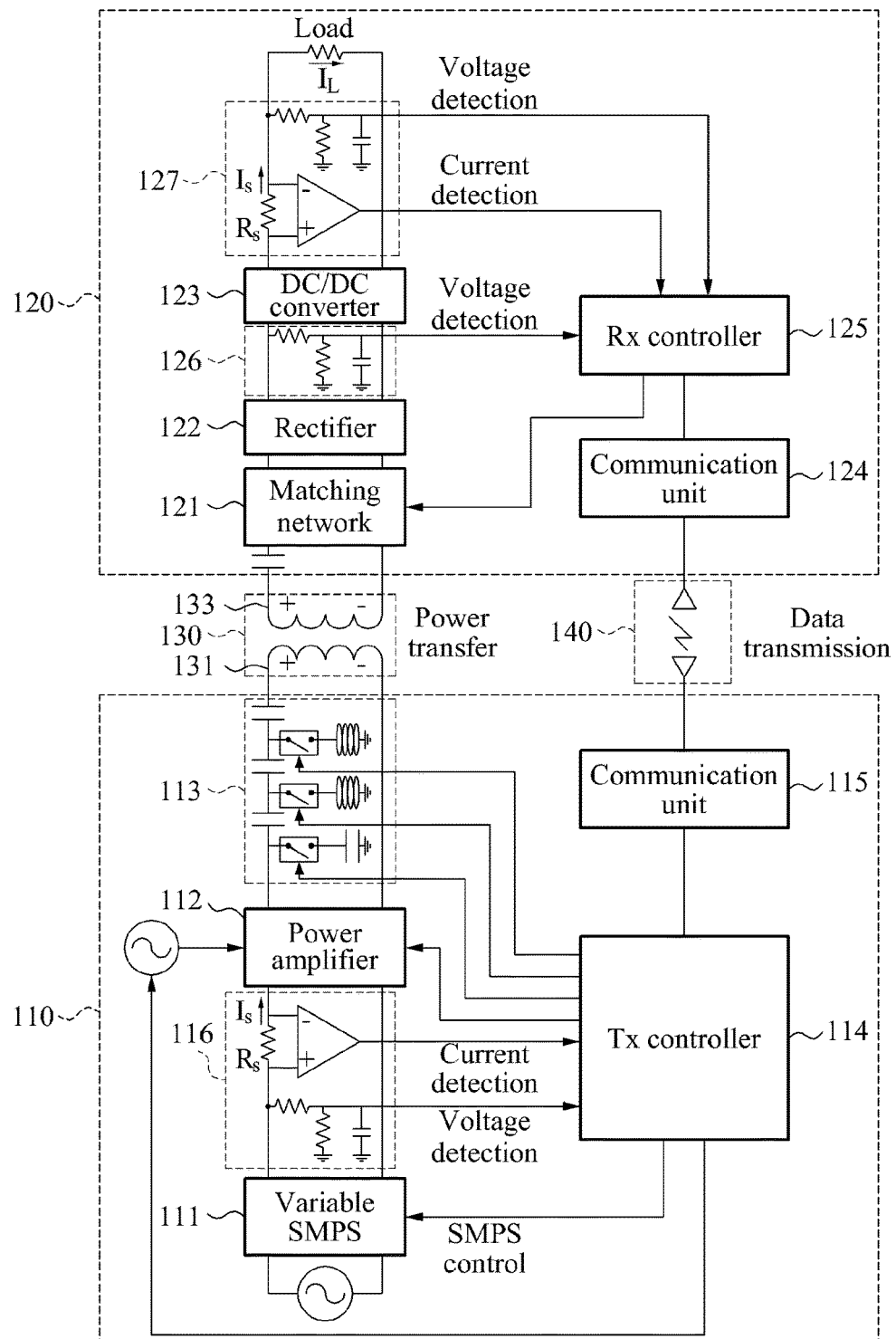
FIG. 1 illustrates an example of a wireless power transmission and reception system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

Schemes of performing communication between a source and a target, or between a source and another source, may include an in-band communication scheme and an out-of-band communication scheme.

In the in-band communication scheme, the source and the target, or the source and the other source, perform communication using the same frequency that is used for power transmission.

In the out-of-band communication scheme, the source and the target, or the source and the other source, perform communication using a frequency that is different from a frequency used for power transmission.

FIG. 1 illustrates an example of a wireless power transmission and reception system.

Referring to FIG. 1, the wireless power transmission and reception system includes a source 110 and a target 120. The source 110 is a device configured to supply wireless power, and may be any electronic device capable of supplying power, for example, a pad, a terminal, a tablet personal computer (PC), a television (TV), a medical device, or an electric vehicle. The target 120 is a device configured to receive wireless power, and may be any electronic device requiring power to operate, for example, a pad, a terminal, a tablet PC, a medical device, an electric vehicle, a washing machine, a radio, or a lighting system.

The source 110 includes a variable switching mode power supply (SMPS) 111, a power amplifier (PA) 112, a matching network 113, a transmission (Tx) controller 114 (for example, Tx control logic), a communication unit 115, and a power detector 116.

The variable SMPS 111 generates a direct current (DC) voltage by switching an alternating current (AC) voltage having a frequency in a band of tens of hertz (Hz) output from a power supply. The variable SMPS 111 may output a fixed DC voltage, or may output an adjustable DC voltage that may be adjusted under the control of the Tx controller 114.

The variable SMPS 111 may control its output voltage supplied to the PA 112 based on a level of power output from the PA 112 so that the PA 112 may operate in a saturation region with a high efficiency at all times, thereby enabling a maximum efficiency to be maintained at all levels of the output power of the PA 112. The PA 112 may be, for example, a Class-E amplifier.

If a fixed SMPS is used instead of the variable SMPS 111, a variable DC-to-DC (DC/DC) converter may be necessary. In this example, the fixed SMPS outputs a fixed DC voltage to the variable DC/DC converter, and the variable DC/DC converter controls its output voltage supplied to the PA 112 based on the level of the power output from the PA 112 so that the PA 112 may operate in the saturation region with a high efficiency at all times, thereby enabling the maximum efficiency to be maintained at all levels of the output power of the PA 112.

The power detector 116 detects an output current and an output voltage of the variable SMPS 111, and outputs, to the Tx controller 114, information on the detected output current and the detected output voltage. Also, the power detector 116 may detect an input current and an input voltage of the PA 112.

The PA 112 generates power by converting a DC voltage having a predetermined level supplied to the PA 112 by the variable SMPS 111 to an AC voltage using a switching pulse signal having a frequency in a band of a few megahertz (MHz) to tens of MHz. For example, the PA 112 may convert a DC voltage supplied to the PA 112 to an AC voltage having a reference resonant frequency $F_{Ref}$, and may generate communication power used for communication, and/or charging power used for charging. The communication power and the charging power may be used in a plurality of targets.

If a high power from a few kilowatts (kW) to tens of kW is to be transmitted using a resonant frequency in a band of tens of kilohertz (kHz) to hundreds of kHz, the PA 112 may be omitted, and power may be supplied to a source resonator 131 from the variable SMPS 111 or a high-power power supply. For example, an inverter may be used in lieu of the PA 112. The inverter may convert a DC power supplied from the high-power power supply to an AC power. The inverter may convert the power by converting a DC voltage having a predetermined level to an AC voltage using a switching pulse signal having a frequency in a band of tens of kHz to hundreds of kHz. For example, the inverter may convert the DC voltage having the predetermined level to an AC voltage having a resonant frequency of the source resonator 131 in a band of tens of kHz to hundreds of kHz.

As used herein, the term "communication power" refers to a low power of 0.1 milliwatt (mW) to 1 mW, and the term "charging power" refers to a high power of a 1 mW to tens of kW consumed by a load of a target. As used herein, the term "charging" refers to supplying power to a unit or element that is configured to charge a battery or other rechargeable device. Additionally, the term "charging" refers to supplying power to a unit or element configured to consume power. For example, the term "charging power" may refer to power consumed by a target while operating, or power used to charge a battery of the target. The unit or element may be, for example, a battery, a display, a sound output circuit, a main processor, or any of various types of sensors.

As used herein, the term "reference resonant frequency" refers to a resonant frequency nominally used by the source 110, and the term "tracking frequency" refers to a resonant frequency used by the source 110 that has been adjusted based on a preset scheme.

The Tx controller 114 may detect a reflected wave of the communication power or the charging power, and may detect mismatching that occurs between a target resonator 133 and the source resonator 131 based on the detected reflected wave. To detect the mismatching, for example, the Tx controller 114 may detect an envelope of the reflected wave, a power amount of the reflected wave, or any other characteristic of the reflected wave that is affected by mismatching.

The matching network 113 compensates for impedance mismatching between the source resonator 131 and the target resonator 133 to achieve optimal matching under the control of the Tx controller 114. The matching network 113 includes at least one inductor and at least one capacitor each connected to a respective switch controlled by the Tx controller 114.

If a high power is to be transmitted using a resonant frequency in a band of tens of kHz to hundreds of kHz, the matching network 113 may be omitted from the source 110 because the effect of the matching network 113 may be reduced when transmitting the high power.

The Tx controller 114 may calculate a voltage standing wave ratio (VSWR) based on a voltage level of the reflected wave and a level of an output voltage of the source resonator 131 or the PA 112. In one example, if the VSWR is greater than a predetermined value, the Tx controller 114 may determine that a mismatch is detected between the source resonator 131 and the target resonator 133.

In another example, if the VSWR is greater than the predetermined value, the Tx controller 114 may calculate a wireless power transmission efficiency for each of N tracking frequencies, determine a tracking frequency $F_{Best}$ providing the best wireless power transmission efficiency among the N tracking frequencies, and adjust the reference resonant frequency $F_{Ref}$ to the tracking frequency $F_{Best}$. The N tracking frequencies may be set in advance.

The Tx controller 114 may adjust a frequency of the switching pulse signal used by the PA 112. The frequency of the switching pulse signal may be determined under the control of the Tx controller 114. For example, by controlling the PA 112, the Tx controller 114 may generate a modulated signal to be transmitted to the target 120. In other words, the Tx controller 114 may transmit a variety of data to the target 120 using in-band communication. The Tx controller 114 may also detect a reflected wave, and may demodulate a signal received from the target 120 from an envelope of the detected reflected wave.

The Tx controller 114 may generate a modulated signal for in-band communication using various methods. For example, the Tx controller 114 may generate the modulated signal by turning on and off a switching pulse signal, by performing delta-sigma modulation, or by any other modulation method known to one of ordinary skill in the art. Additionally, the Tx controller 114 may generate a pulse-width modulated (PWM) signal having a predetermined envelope.

The Tx controller 114 may determine an initial wireless power to be transmitted to the target 120 based on a change in a temperature of the source 110, a battery state of the target 120, a change in an amount of power received by the target 120, and/or a change in a temperature of the target 120.

The source 110 may further include a temperature measurement sensor (not illustrated) configured to sense a change in a temperature of the source 110. The source 110 may receive from the target 120 information regarding the battery state of the target 120, the change in the amount of power received by the target 120, and/or the change in the temperature of the target 120 by communication with the target 120. The source 110 may detect the change in the temperature of the target 120 based on the data received from the target 120.

The Tx controller 114 may adjust a voltage supplied to the PA 112 using a lookup table (LUT). The lookup table may store a level of the voltage to be supplied to the PA 112 based on the change in the temperature of the source 110. For example, when the temperature of the source 110 rises, the Tx controller 114 may reduce the voltage to be supplied to the PA 112 by controlling the variable SMPS 111.

The communication unit 115 may perform out-of-band communication using a separate communication channel. The communication unit 115 may include a communication module, such a ZigBee module, a Bluetooth module, or any other communication module known to one of ordinary skill in the art that the communication unit 115 may use to transmit and receive data 140 to and from the target 120 using the out-of-band communication.

The source resonator 131 transmits electromagnetic energy 130 to the target resonator 133. For example, the source resonator 131 may transmit the communication power or the charging power to the target 120 via a magnetic coupling with the target resonator 133.

The source resonator 131 may be made of a conducting material. Also, although not shown in FIG. 1, the source resonator 131 may be disposed in a container of refrigerant to enable the source resonator 131 to maintain a superconducting state. A heated refrigerant that has transitioned to a gaseous state may be liquefied to a liquid state by a cooler. The target resonator 133 may also be made of a superconducting material. In this instance, the target resonator 133 may also be disposed in a container of refrigerant to enable the target resonator 133 to maintain a superconducting state.

As illustrated in FIG. 1, the target 120 includes a matching network 121, a rectifier 122, a DC/DC converter 123, a communication unit 124, a reception (Rx) controller 125 (for example, Rx control logic), a voltage detector 126, and a power detector 127.

The target resonator 133 receives the electromagnetic energy 130 from the source resonator 131. For example, the target resonator 133 may receive the communication power or the charging power from the source 110 via a magnetic coupling with the source resonator 131. Additionally, the target resonator 133 may receive data from the source 110 using in-band communication.

The target resonator 133 may receive the initial wireless power determined by the transmission controller 114 based on the change in the temperature of the source 110, the battery state of the target 120, the change in the amount of power received by the target 120, and/or the change in the temperature of the target 120.

The matching network 121 matches an input impedance viewed from the source 110 to an output impedance viewed from a load of the target 120. The matching network 121 may be configured to have at least one capacitor and at least one inductor.

The rectifier 122 generates a DC voltage by rectifying an AC voltage received by the target resonator 133.

The DC/DC converter 123 adjusts a level of the DC voltage output from the rectifier 122 based on a voltage required by the load. As an example, the DC/DC converter 123 may adjust the level of the DC voltage output from the rectifier 122 to a level in a range of 3 volts (V) to 10 V.

The voltage detector 126 detects a voltage of an input terminal of the DC/DC converter 123, and the power detector 127 detects a current and a voltage of an output terminal of the DC/DC converter 123. The detected voltage of the input terminal may be used to calculate a wireless power transmission efficiency of the power received from the source 110. Additionally, the detected current and the detected voltage of the output terminal may be used by the Rx controller 125 to calculate an amount of power actually transferred to the load. The Tx controller 114 of the source 110 may calculate an amount of power that needs to be transmitted by the source 110 to the target 120 based on an amount of power required by the load and the amount of power actually transferred to the load.

If the amount of the power actually transferred to the load calculated by the Rx controller 125 is transmitted to the source 110 by the communication unit 124, the Tx controller 114 may calculate an amount of power that needs to be transmitted to the target 120, and may control either one or both of the variable SMPS 111 and the power amplifier 112 to generate an amount of power that will enable the calculated amount of power to be transmitted by the source 110.

The Rx controller 125 may perform in-band communication to transmit and receive data to and from the source 110 using a resonant frequency. During the in-band communication, the Rx controller 125 may demodulate a received signal by detecting a signal between the target resonator 133 and the rectifier 122, or detecting an output signal of the rectifier 122. In particular, the Rx controller 125 may demodulate a message received using the in-band communication.

Additionally, the Rx controller 125 may adjust an input impedance of the target resonator 133 using the matching network 121 to modulate a signal to be transmitted to the source 110. For example, the Rx controller 125 may adjust the matching network 121 to increase the impedance of the target resonator 133 so that a reflected wave will be detected by the Tx controller 114 of the source 110. Depending on whether the reflected wave is detected, the Tx controller 114 may detect a first value, for example a binary number "0," or a second value, for example a binary number "1". For example, when the reflected wave is detected, the Tx controller 114 may detect "0", and when the reflected wave is not detected, the Tx controller 114 may detect "1". Alternatively, when the reflected wave is detected, the Tx controller 114 may detect "1", and when the reflected wave is not detected, the Tx controller 114 may detect "0".

The communication unit 124 of the target 120 may transmit a response message to the communication unit 115 of the source 110. For example, the response message may include any one or any combination of a product type of the target 120, manufacturer information of the target 120, a model name of the target 120, a battery type of the target 120, a charging scheme of the target 120, an impedance value of a load of the target 120, information on characteristics of the target resonator 133 of the target 120, information on a frequency band used by the target 120, an amount of power consumed by the target 120, an identifier (ID) of the target 120, product version information of the target 120, standard information of the target 120, and any other information about the target 120.

The communication unit 124 may perform out-of-band communication using a separate communication channel. For example, the communication unit 124 may include a communication module, such as a ZigBee module, a Bluetooth module, or any other communication module known to one of ordinary skill in the art that the communication unit 124 may use to transmit and receive the data 140 to and from the source 110 using the out-of-band communication.

The communication unit 124 may receive a wake-up request message from the source 110, and the power detector 127 may detect an amount of power received by the target resonator 133. The communication unit 124 may transmit to the source 110 information on the detected amount of the power received by the target resonator 133. The information on the detected amount of the power received by the target resonator 133 may include, for example, an input voltage value and an input current value of the rectifier 122, an output voltage value and an output current value of the rectifier 122, an output voltage value and an output current value of the DC/DC converter 123, and any other information about the detected amount of the power received by the target resonator 133.

The source 110 and the target 120 of FIG. 1 may correspond to a wireless power transmission apparatus and a wireless power reception apparatus to be described hereinafter.

In the following description of FIGS. 2A through 4B, unless otherwise indicated, the term "resonator" may refer to both a source resonator and a target resonator. The resonator of FIGS. 2A through 4B may be used as the resonators described with reference to FIGS. 1 and 5-11.

Figure 2A:
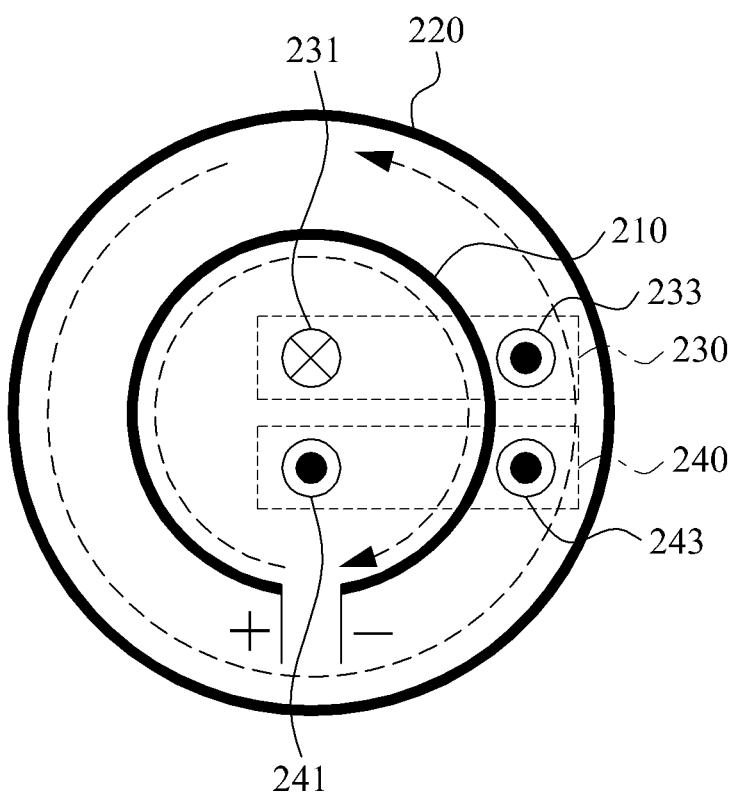
FIGS. 2A and 2B illustrate examples of a distribution of a magnetic field in a feeder and a resonator.
Figure 2B:
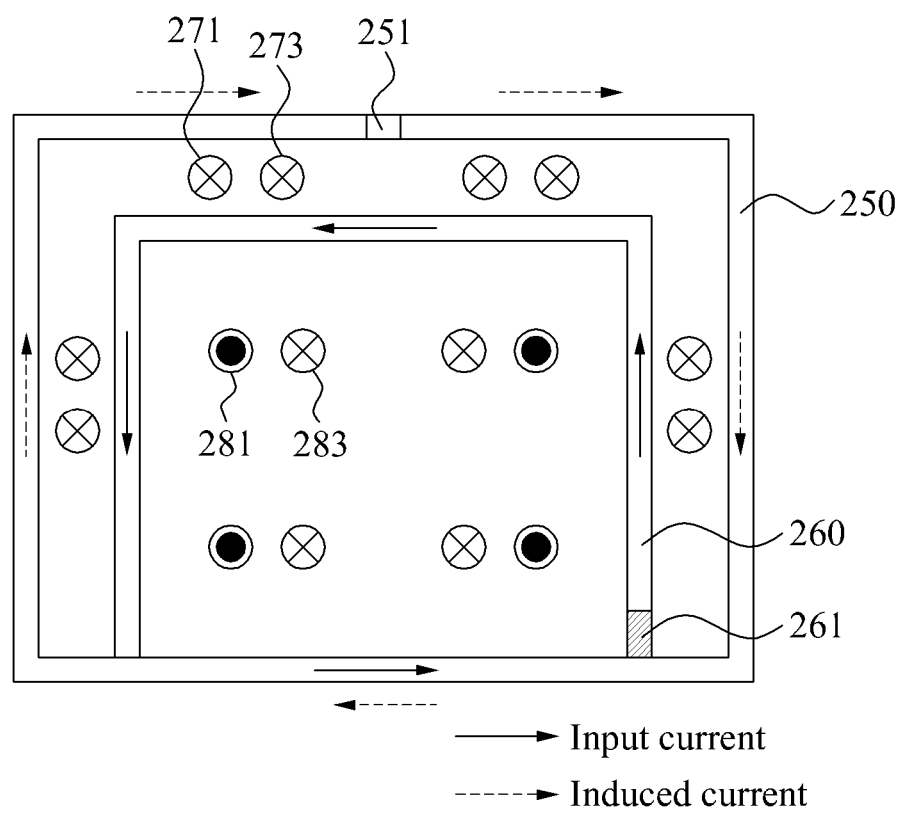

FIGS. 2A and 2B illustrate examples of a distribution of a magnetic field in a feeder and a resonator.

When a resonator receives power supplied through a separate feeder, magnetic fields are generated in both the feeder and the resonator.

A source resonator and a target resonator may each have a dual loop structure including an external loop and an internal loop.

FIG. 2A illustrates an example of a structure of a wireless power transmitter in which a feeder 210 and a resonator 220 do not have a common ground. Referring to FIG. 2A, when an input current flows into the feeder 210 through a terminal labeled "+" and out of the feeder 210 through a terminal labeled "−", a magnetic field 230 is generated by the input current. A direction 231 of the magnetic field 230 inside the feeder 210 is into the plane of FIG. 2A, and is opposite to a direction 233 of the magnetic field 230 outside the feeder 210, which is out of the plane of FIG. 2A. The magnetic field 230 generated by the feeder 210 induces a current in the resonator 220. A direction of the induced current in the resonator 220 is opposite to a direction of the input current in the feeder 210 as indicated by the dashed lines with arrowheads in FIG. 2A.

The induced current in the resonator 220 generates a magnetic field 240. Directions of the magnetic field 240 generated by the resonator 220 are the same at all positions inside the resonator 220, and are out of the plane of FIG. 2A. Accordingly, a direction 241 of the magnetic field 240 generated by the resonator 220 inside the feeder 210 is the same as a direction 243 of the magnetic field 240 generated by the resonator 220 outside the feeder 210.

Consequently, when the magnetic field 230 generated by the feeder 210 and the magnetic field 240 generated by the resonator 220 are combined, a strength of the total magnetic field decreases inside the feeder 210, but increases outside the feeder 210. Accordingly, when power is supplied to the resonator 220 through the feeder 210 configured as illustrated in FIG. 2A, the strength of the total magnetic field decreases in the portion of the resonator 220 inside the feeder 210, but increases in the portion of the resonator 220 outside the feeder 210. When a distribution of a magnetic field is random or not uniform in the resonator 220, it may be difficult to perform impedance matching because an input impedance may frequently vary. Additionally, when the strength of the total magnetic field increases, a wireless power transmission efficiency increases. Conversely, when the strength of the total magnetic field decreases, the wireless power transmission efficiency decreases. Accordingly, the wireless power transmission efficiency may be reduced on average.

FIG. 2B illustrates an example of a structure of a wireless power transmission apparatus in which a resonator 250 and a feeder 260 have a common ground. The resonator 250 includes a capacitor 251. The feeder 260 receives a radio frequency (RF) signal via a port 261. When the RF signal is input to the feeder 260, an input current is generated in the feeder 260. The input current flowing in the feeder 260 generates a magnetic field, and a current is induced in the resonator 250 by the magnetic field. Additionally, another magnetic field is generated by the induced current flowing in the resonator 250. In this example, a direction of the input current flowing in the feeder 260 is opposite to a direction of the induced current flowing in the resonator 250. Accordingly, in a region between the resonator 250 and the feeder 260, a direction 271 of the magnetic field generated by the input current is the same as a direction 273 of the magnetic field generated by the induced current, and thus the strength of the total magnetic field increases. Conversely, inside the feeder 260, a direction 281 of the magnetic field generated by the input current is opposite to a direction 283 of the magnetic field generated by the induced current, and thus the strength of the total magnetic field decreases. Therefore, the strength of the total magnetic field decreases in a portion of the resonator 250 inside the feeder 260, but increases in a portion of the resonator 250 outside the feeder 260.

An input impedance may be adjusted by adjusting an internal area of the feeder 260. The input impedance is an impedance viewed in a direction from the feeder 260 to the resonator 250. When the internal area of the feeder 260 increases, the input impedance increases. Conversely, when the internal area of the feeder 260 decreases, the input impedance decreases. However, if the magnetic field is randomly or not uniformly distributed in the resonator 250, the input impedance may vary based on a location of a target even if the internal area of the feeder 260 has been adjusted to adjust the input impedance to match an output impedance of a power amplifier for a specific location of the target. Accordingly, a separate matching network may be needed to match the input impedance to the output impedance of the power amplifier. For example, when the input impedance increases, a separate matching network may be needed to match the increased input impedance to a relatively low output impedance of the power amplifier.

Figure 3A:
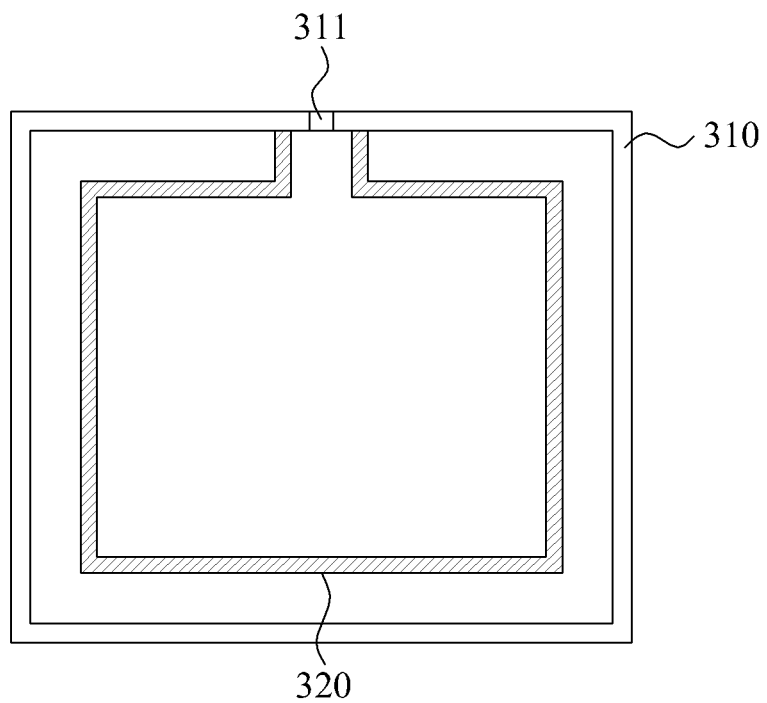
FIGS. 3A and 3B illustrate an example of a wireless power transmission apparatus.
Figure 3B:
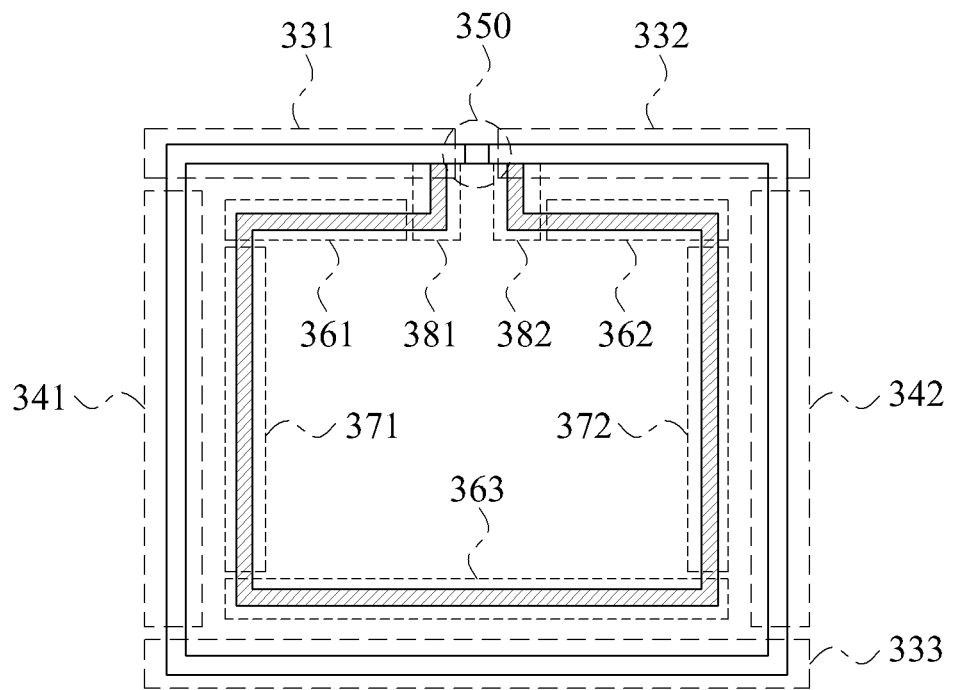

FIGS. 3A and 3B illustrate an example of a wireless power transmission apparatus.

Referring to FIG. 3A, the wireless power transmission apparatus includes a resonator 310 and a feeder 320. The resonator 310 includes a capacitor 311. The feeder 320 is electrically connected to both ends of the capacitor 311.

FIG. 3B illustrates a structure of the wireless power transmission apparatus of FIG. 3A in greater detail. The resonator 310 includes a first transmission line (not identified by a reference numeral in FIG. 3B, but formed by various elements in FIG. 3B as discussed below), a first conductor 341, a second conductor 342, and at least one capacitor 350.

The capacitor 350 is connected in series between a first signal conducting portion 331 and a second signal conducting portion 332 in the first transmission line, causing an electric field to be concentrated in the capacitor 350. In general, a transmission line includes at least one conductor disposed in an upper portion of the transmission line, and at least one conductor disposed in a lower portion of the transmission line. A current may flow through the at least one conductor disposed in the upper portion of the transmission line, and the at least one conductor disposed in the lower portion of the transmission line may be electrically grounded. In the example in FIG. 3B, a conductor disposed in the upper portion of the first transmission line is separated into two portions that will be referred to as the first signal conducting portion 331 and the second signal conducting portion 332, and a conductor disposed in the lower portion of the first transmission line will be referred to as a first ground conducting portion 333.

As illustrated in FIG. 3B, the resonator 310 has a generally two-dimensional (2D) structure. The first transmission line includes the first signal conducting portion 331 and the second signal conducting portion 332 disposed in the upper portion of the first transmission line, and the first ground conducting portion 333 disposed in the lower portion of the first transmission line. The first signal conducting portion 331 and the second signal conducting portion 332 are disposed to face the first ground conducting portion 333. A current flows through the first signal conducting portion 331 and the second signal conducting portion 332.

Additionally, one end of the first signal conducting portion 331 is connected to one end of the first conductor 341, the other end of the first signal conducting portion 331 is connected to one end of the capacitor 350, and the other end of the first conductor 341 is connected to one end of the first ground conducting portion 333. One end of the second signal conducting portion 332 is connected to one end of the second conductor 342, the other end of the second signal conducting portion 332 is connected to the other end of the capacitor 350, and the other end of the second conductor 342 is connected to the other end of the first ground conducting portion 333. Accordingly, the first signal conducting portion 331, the second signal conducting portion 332, the first ground conducting portion 333, the first conductor 341, and the second conductor 342 are connected to each other, causing the resonator 310 to have an electrically closed loop structure. The term "loop structure" includes a polygonal structure, a circular structure, a rectangular structure, and any other geometrical structure that is closed, i.e., a geometrical structure that does not have any opening in its perimeter. The expression "having a loop structure" indicates a structure that is electrically closed.

The capacitor 350 is inserted into an intermediate portion of the first transmission line. In the example in FIG. 3B, the capacitor 350 is inserted into a space between the first signal conducting portion 331 and the second signal conducting portion 332. The capacitor 350 may be a lumped element capacitor, a distributed element capacitor, or any other type of capacitor known to one of ordinary skill in the art. For example, a distributed element capacitor may include zigzagged conductor lines and a dielectric material having a high permittivity disposed between the zigzagged conductor lines.

The capacitor 350 inserted into the first transmission line may cause the resonator 310 to have a characteristic of a metamaterial. A metamaterial is a material having an electrical characteristic that is not found in nature, and thus may have an artificially designed structure. All materials existing in nature have a magnetic permeability and a permittivity. Most materials have a positive magnetic permeability and a positive permittivity.

In the case of most materials, a right-hand rule may be applied to an electric field, a magnetic field, and a Poynting vector, so the corresponding materials may be referred to as right-handed materials (RHMs). However, a metamaterial having a magnetic permeability and/or a permittivity not found in nature may be classified into an epsilon negative (ENG) material, a mu negative (MNG) material, a double negative (DNG) material, a negative refractive index (NRI) material, a left-handed (LH) material, and any other metamaterial classification known to one of ordinary skill in the art based on a sign of the permittivity of the metamaterial and a sign of the magnetic permeability of the metamaterial.

If the capacitor 350 is a lumped element capacitor and the capacitance of the capacitor 350 is appropriately determined, the resonator 310 may have a characteristic of a metamaterial. If the resonator 310 is caused to have a negative magnetic permeability by appropriately adjusting the capacitance of the capacitor 350, the resonator 310 may also be referred to as an MNG resonator. Various criteria may be applied to determine the capacitance of the capacitor 350. For example, the various criteria may include a criterion for enabling the resonator 310 to have the characteristic of the metamaterial, a criterion for enabling the resonator 310 to have a negative magnetic permeability at a target frequency, a criterion for enabling the resonator 310 to have a zeroth-order resonance characteristic at the target frequency, and any other suitable criterion. Based on any one criterion or any combination of the aforementioned criteria, the capacitance of the capacitor 350 may be appropriately determined.

The resonator 310, hereinafter referred to as the MNG resonator 310, may have a zeroth-order resonance characteristic of having a resonant frequency when a propagation constant is 0. When the MNG resonator 310 has the zeroth-order resonance characteristic, the resonant frequency is independent of a physical size of the MNG resonator 310. The resonant frequency of the MNG resonator 310 having the zeroth-order resonance characteristic may be changed without changing the physical size of the MNG resonator 310 by changing the capacitance of the capacitor 350.

In a near field, the electric field is concentrated in the capacitor 350 inserted into the first transmission line, causing the magnetic field to become dominant in the near field. The MNG resonator 310 has a relatively high Q-factor when the capacitor 350 is a lumped element capacitor, thereby increasing a wireless power transmission efficiency. The Q-factor indicates a level of an ohmic loss or a ratio of a reactance with respect to a resistance in the wireless power transmission. As will be understood by one of ordinary skill in the art, the wireless power transmission efficiency will increase as the Q-factor increases.

Although not illustrated in FIG. 3B, a magnetic core passing through the MNG resonator 310 may be provided to increase a wireless power transmission distance.

Referring to FIG. 3B, the feeder 320 includes a second transmission line (not identified by a reference numeral in FIG. 3B, but formed by various elements in FIG. 3B as discussed below), a third conductor 371, a fourth conductor 372, a fifth conductor 381, and a sixth conductor 382.

The second transmission line includes a third signal conducting portion 361 and a fourth signal conducting portion 362 disposed in an upper portion of the second transmission line, and a second ground conducting portion 363 disposed in a lower portion of the second transmission line. The third signal conducting portion 361 and the fourth signal conducting portion 362 are disposed to face the second ground conducting portion 363. A current flows through the third signal conducting portion 361 and the fourth signal conducting portion 362.

Additionally, one end of the third signal conducting portion 361 is connected to one end of the third conductor 371, the other end of the third signal conducting portion 361 is connected to one end of the fifth conductor 381, and the other end of the third conductor 371 is connected to one end of the second ground conducting portion 363. One end of the fourth signal conducting portion 362 is connected to one end of the fourth conductor 372, the other end of the fourth signal conducting portion 362 is connected to one end of the sixth conductor 382, and the other end of the fourth conductor 372 is connected to the other end of the second ground conducting portion 363. The other end of the fifth conductor 381 is connected to the first signal conducting portion 331 at or near where the first signal conducting portion 331 is connected to one end of the capacitor 350, and the other end of the sixth conductor 382 is connected to the second signal conducting portion 332 at or near where the second signal conducting portion 332 is connected to the other end of the capacitor 350. Thus, the fifth conductor 381 and the sixth conductor 382 are connected in parallel with both ends of the capacitor 350. The fifth conductor 381 and the sixth conductor 382 may be used as input ports to receive an RF signal as an input.

Accordingly, the third signal conducting portion 361, the fourth signal conducting portion 362, the second ground conducting portion 363, the third conductor 371, the fourth conductor 372, the fifth conductor 381, the sixth conductor 382, and the resonator 310 are connected to each other, causing the resonator 310 and the feeder 320 to have an electrically closed loop structure. The term "loop structure" includes a polygonal structure, a circular structure, a rectangular structure, and any other geometrical structure that is closed, i.e., a geometrical structure that does not have any opening in its perimeter. The expression "having a loop structure" indicates a structure that is electrically closed.

If an RF signal is input to the fifth conductor 381 or the sixth conductor 382, an input current flows in the feeder 320 and the resonator 310, generating a magnetic field that induces a current in the resonator 310. A direction of the input current flowing in the feeder 320 is the same as a direction of the induced current flowing in the resonator 310, thereby causing a strength of the total magnetic field inside the resonator 310 to increase inside the feeder 320, but decrease outside the feeder 320.

An input impedance is determined by an area of a region between the resonator 310 and the feeder 320. Accordingly, a separate matching network used to match the input impedance to an output impedance of a power amplifier may not be needed. However, even if a matching network is used, the input impedance may be adjusted by adjusting a size of the feeder 320, and accordingly a structure of the matching network may be simplified. The simplified structure of the matching network reduces a matching loss of the matching network.

The second transmission line, the third conductor 371, the fourth conductor 372, the fifth conductor 381, and the sixth conductor 382 of the feeder 320 may have the same structure as the resonator 310. For example, if the resonator 310 has a loop structure, the feeder 320 may also have a loop structure. As another example, is the resonator 310 has a circular structure, the feeder 320 may also have a circular structure.

Figure 4A:
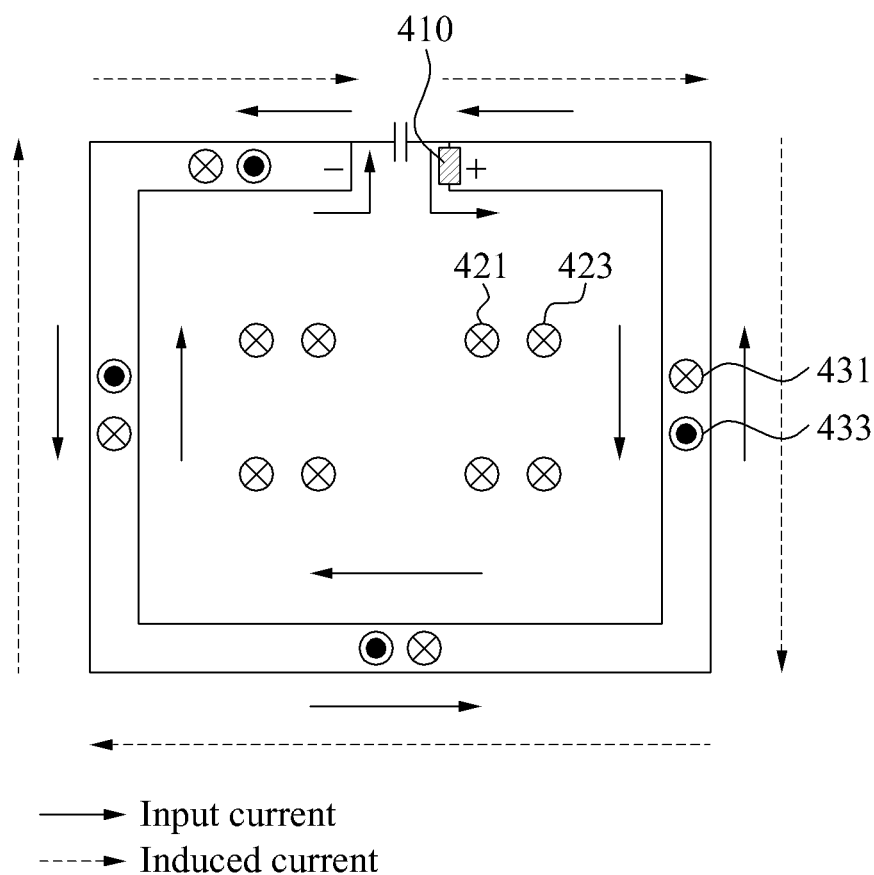
FIG. 4A illustrates an example of a distribution of a magnetic field inside a resonator produced by feeding a feeder.

FIG. 4A illustrates an example of a distribution of a magnetic field inside a resonator produced by feeding a feeder. FIG. 4A more simply illustrates the resonator 310 and the feeder 320 of FIGS. 3A and 3B, and the names and the reference numerals of the various elements in FIG. 3B will be used in the following description of FIG. 4A for ease of description.

A feeding operation may be an operation of supplying power to a source resonator in wireless power transmission, or an operation of supplying AC power to a rectifier in the wireless power transmission. FIG. 4A illustrates a direction of an input current flowing in the feeder 320, and a direction of an induced current flowing in the resonator 310 operating as a source resonator. Additionally, FIG. 4A illustrates a direction of a magnetic field generated by the input current of the feeder 320, and a direction of a magnetic field generated by the induced current of the resonator 310.

Referring to FIG. 4A, the fifth conductor 381 or the sixth conductor 382 of the feeder 320 of FIG. 3B may be used as an input port 410. In the example in FIG. 4A, the sixth conductor 382 is being used as the input port 410. The input port 410 receives an RF signal as an input. The RF signal may be output from a power amplifier. The power amplifier may increase or decrease an amplitude of the RF signal based on a power requirement of a target. The RF signal received by the input port 410 is represented in FIG. 4A as an input current flowing in the feeder 320. The input current flows in a clockwise direction in the feeder 320 along the second transmission line of the feeder 320. The fifth conductor 381 and the sixth conductor 382 of the feeder 320 are electrically connected to the resonator 310. More particularly, the fifth conductor 381 of the feeder 320 is connected to the first signal conducting portion 331 of the resonator 310, and the sixth conductor 382 of the feeder 320 is connected to the second signal conducting portion 332 of the resonator 310. Accordingly, the input current flows in both the resonator 310 and the feeder 320. The input current flows in a counterclockwise direction in the resonator 310. The input current flowing in the resonator 310 generates a magnetic field, and the magnetic field induces a current in the resonator 310. The induced current flows in a clockwise direction in the resonator 310. The induced current in the resonator 310 supplies energy to the capacitor 311 of the resonator 310, and also generates a magnetic field. In this example, the input current flowing in the feeder 320 and the resonator 310 is indicated by the solid lines with arrowheads in FIG. 4A, and the induced current flowing in the resonator 310 is indicated by the dashed lines with arrowheads in FIG. 4A.

A direction of a magnetic field generated by a current is determined based on the right-hand rule. As illustrated in FIG. 4A, inside the feeder 320, a direction 421 of the magnetic field generated by the input current flowing in the feeder 320 is the same as a direction 423 of the magnetic field generated by the induced current flowing in the resonator 310. Accordingly, the strength of the total magnetic field increases inside the feeder 320.

In contrast, in a region between the feeder 320 and the resonator 310, a direction 433 of the magnetic field generated by the input current flowing in the feeder 320 is opposite to a direction 431 of the magnetic field generated by the induced current flowing in the resonator 310. Accordingly, the strength of the total magnetic field decreases in the region between the feeder 320 and the resonator 310.

Typically, in a resonator having a loop structure, a strength of a magnetic field decreases in the center of the resonator, and increases near an outer periphery of the resonator. However, referring to FIG. 4A, since the feeder 320 is electrically connected to both ends of the capacitor 311 of the resonator 310, the direction of the induced current in the resonator 310 is the same as the direction of the input current in the feeder 320. Since the induced current in the resonator 310 flows in the same direction as the input current in the feeder 320, the strength of the total magnetic field increases inside the feeder 320, and decreases outside the feeder 320. As a result, due to the feeder 320, the strength of the total magnetic field increases in the center of the resonator 310 having the loop structure, and decreases near the outer periphery of the resonator 310, thereby compensating for the normal characteristic of the resonator 310 having the loop structure in which the strength of the magnetic field decreases in the center of the resonator 310, and increases near the outer periphery of the resonator 310. Thus, the strength of the total magnetic field may be constant inside the resonator 310.

A wireless power transmission efficiency of transmitting power from a source resonator to a target resonator is proportional to the strength of the total magnetic field generated in the source resonator. In other words, when the strength of the total magnetic field increases in the center of the source resonator, the wireless power transmission efficiency also increases.

Figure 4B:
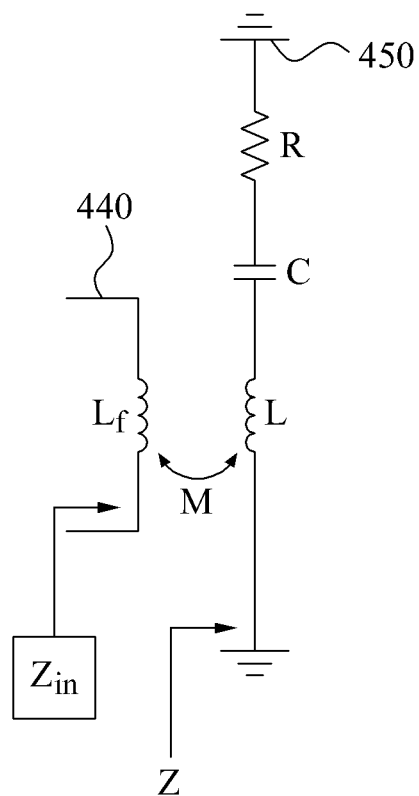
FIG. 4B illustrates examples of an equivalent circuit of a feeder and a resonator.

FIG. 4B illustrates an example of equivalent circuits of a feeder and a resonator.

Referring to FIG. 4B, a feeder 440 and a resonator 450 may be represented by the equivalent circuits in FIG. 4B. The feeder 440 is represented as an inductor having an inductance $L_f$, and the resonator 450 is represented as a series connection of an inductor having an inductance L coupled to the inductance $L_f$ of the feeder 440 by a mutual inductance M, a capacitor having a capacitance C, and a resistor having a resistance R. An example of an input impedance $Z_{in}$ viewed in a direction from the feeder 440 to the resonator 450 may be expressed by the following Equation 1.

$$Z_{in} = \frac{(\omega M)^2}{Z} \quad (1)$$

In Equation 1, M denotes a mutual inductance between the feeder 440 and the resonator 450, ω denotes a resonant frequency of the feeder 440 and the resonator 450, and Z denotes an impedance viewed in a direction from the resonator 450 to a target. As can be seen from Equation 1, the input impedance $Z_{in}$ is proportional to the square of the mutual inductance M. Accordingly, the input impedance $Z_{in}$ may be adjusted by adjusting the mutual inductance M between the feeder 440 and the resonator 450. The mutual inductance M depends on an area of a region between the feeder 440 and the resonator 450. The area of the region between the feeder 440 and the resonator 450 may be adjusted by adjusting a size of the feeder 440, thereby adjusting the mutual inductance M and the input impedance $Z_{in}$. Since the input impedance $Z_{in}$ may be adjusted by adjusting the size of the feeder 440, it may be unnecessary to use a separate matching network to perform impedance matching with an output impedance of a power amplifier.

In the resonator 450 and the feeder 440 included in a wireless power reception apparatus, a magnetic field may be distributed as illustrated in FIG. 4A. The resonator 450 may operate as a target resonator 450. For example, the target resonator 450 may receive wireless power from a source resonator via magnetic coupling with the source resonator. The received wireless power induces a current in the target resonator 450. The induced current in the target resonator 450 generates a magnetic field, which induces a current in the feeder 440. If the target resonator 450 is connected to the feeder 440 as illustrated in FIG. 4A, the induced current in the target resonator 450 will flow in the same direction as the induced current in the feeder 440. Accordingly, for the reasons discussed above in connection with FIG. 4A, the strength of the total magnetic field will increase inside the feeder 440, but will decrease in a region between the feeder 440 and the target resonator 450.

Hereinafter, for ease of description and conciseness, a "source" and a "wireless power transmission apparatus" may also be referred to as a power transmitting unit (PTU). Also, a "target" and a "wireless power reception apparatus" may also be referred to as a power receiving unit (PRU). A PTU operating in a master mode may be referred to as a "master device", and a PTU operating in a slave mode may be referred to as a "slave device".

A master device may be network-connected to at least one slave device. The expression "network-connected" refers to configuring a network to transmit and receive data between devices. In a network, the master device may operate as a controller of the slave device, and the slave device may be controlled by the master device. The slave device may be synchronized with the master device in terms of a frequency hopping sequence and time. Accordingly, each slave device may transmit and receive data for a predetermined period of time based on the control of the master device, and thus collision or overlapping with another slave device existing in a network may be prevented.

Figure 5:
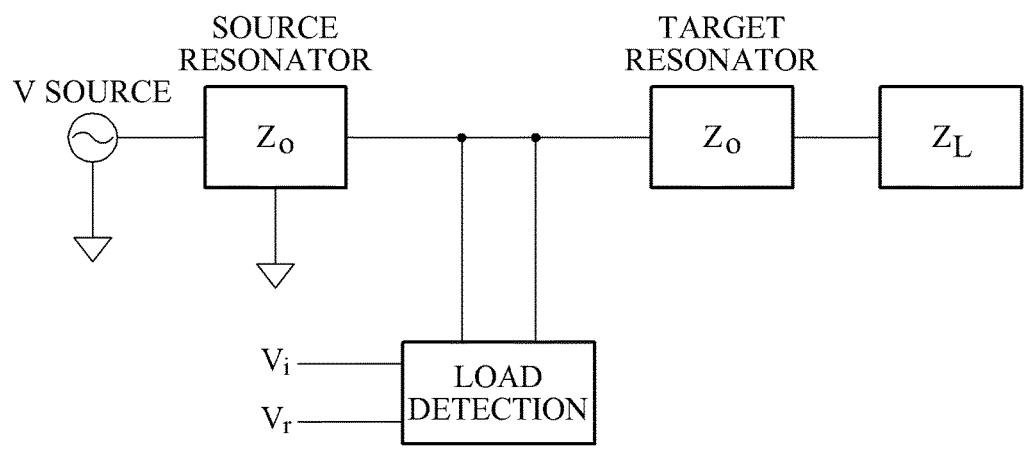
FIG. 5 illustrates an example of a principle of load detection.

FIG. 5 illustrates an example of a principle of load detection.

Referring to FIG. 5, the load detection may be performed, for example, between a source resonator and a target resonator. Various method of load detection are well known to one of ordinary skill in the art, and thus will not be described here for conciseness. In resonant power transmission, a relational expression of voltage based on an impedance between the source resonator and the target resonator may be expressed by the following Equation 2.

$$V_{max} = |V_i| + |V_r| = |V_i| * (1 + |\Gamma|) \quad (2)$$
$$V_{min} = |V_i| - |V_r| = |V_i| * (1 - |\Gamma|)$$
$$VSWR = \frac{V_{max}}{V_{min}} = \frac{|V_i| * (1 + |\Gamma|)}{|V_i| * (1 - |\Gamma|)} = \frac{1 + |\Gamma|}{1 - |\Gamma|}$$

In Equation 2, $V_i$ denotes an output voltage of the source resonator, and $V_r$ denotes a reflected voltage caused by impedance mismatching. A reflection coefficient $\Gamma$ in Equation 2 may be expressed by the following Equation 3.

$$\Gamma = \frac{V_r}{V_i} = \frac{Z_L - Z_o}{Z_L + Z_o} \quad (3)$$

In Equation 3, $Z_O$ denotes an impedance of each of the source resonator and the target resonator, and $Z_L$ denotes an impedance of a load connected to the target resonator. This example assumes that the impedance of the source resonator is matched to the impedance of the target resonator.

Figure 6:
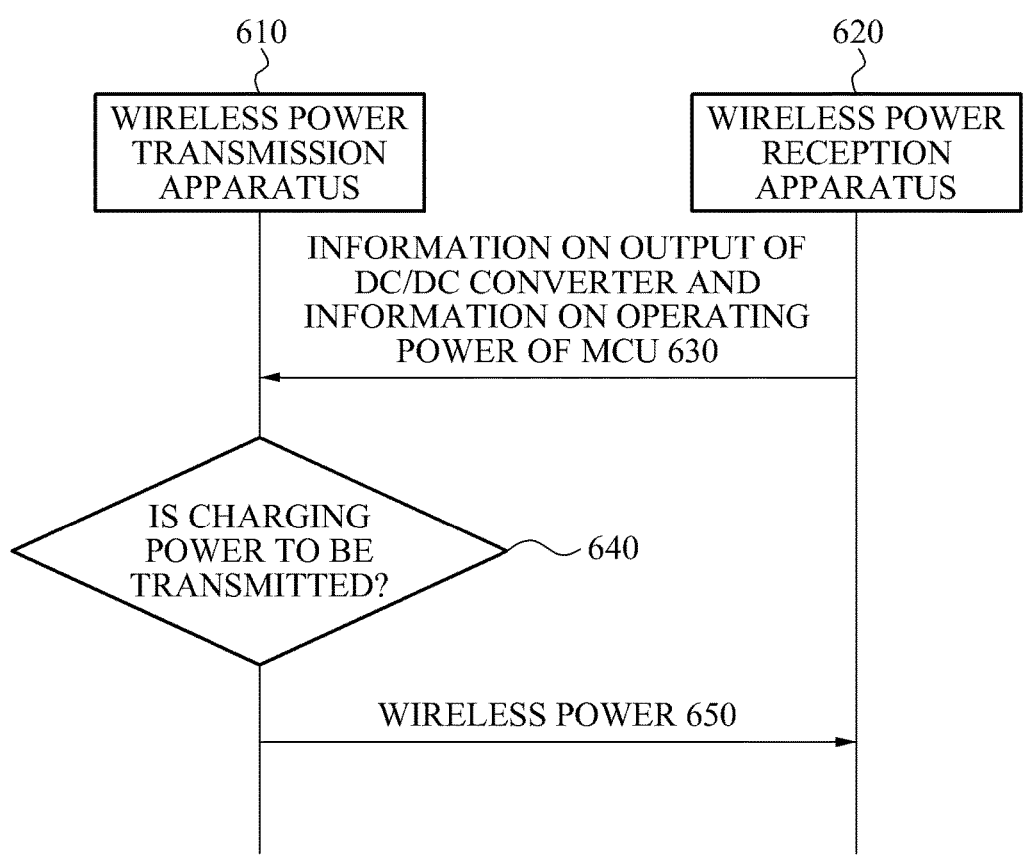
FIG. 6 illustrates an example of a method of transmitting a communication power in a wireless power transmission system.

FIG. 6 illustrates an example of a method of transmitting a communication power in a wireless power transmission system.

Referring to FIG. 6, in 630, a wireless power transmission apparatus 610 receives, from a wireless power reception apparatus 620, information on an operating power of a micro control unit (MCU) and information on an output of a DC/DC converter of the wireless power reception apparatus 620. The information on the output of the DC/DC converter may include information on an output power and an output voltage of the DC/DC converter. The information on the operating power of the MCU may include information on a power to be used for normal operation of the MCU. The operating power of the MCU is a power to be used for normal communication performed between the wireless power transmission apparatus 610 and the wireless power reception apparatus 620.

In 630, the wireless power transmission apparatus 610 may additionally receive information regarding whether the wireless power reception apparatus 620 is supplied with a power from an external power supply. The external power supply is a power supply capable of more supplying a more stable power compared to a wireless power transmitted by the wireless power transmission apparatus 610 through a resonator. The external power supply may perform wired power transmission to the wireless power transmission apparatus 610. That, is, the external power supply may be connected to the wireless power transmission apparatus 610 by wires. The wireless power reception apparatus 620 may transmit, to the wireless power transmission apparatus 610, data providing information on a power reception status of the wireless power reception apparatus 620. Information regarding whether the wireless power reception apparatus 620 is supplied with a power from an external power supply may be included in the data providing information on the power reception status. For example, the wireless power reception apparatus 620 may transmit, to the wireless power transmission apparatus 610, information indicating whether the wireless power reception apparatus 620 is connected to the external power supply by wires.

The wireless power transmission apparatus 610 may detect a load by supplying a power to be used for detecting a load on the wireless power transmission apparatus 610. The load detection may be performed by sensing a change in impedance through the load. When a load is detected through a power to be used for load detection, the wireless power transmission apparatus 610 may communicate with the wireless power reception apparatus 620 to verify a presence of the wireless power reception apparatus 620. The power to be used for load detection and a power to be used for communication performed with the wireless power reception apparatus 620 may be supplied at a predetermined interval.

In 640, the wireless power transmission apparatus 610 determines whether a charging power is to be transmitted. The power transmitted from the wireless power transmission apparatus 610 to the wireless power reception apparatus 620 may be classified into a charging power and a communication power. The charging power is a power sufficient for the wireless power reception apparatus 620 to perform normal operations including battery charging. The communication power is a power to be used by the wireless power reception apparatus for communication performed between the wireless power reception apparatus 620 and the wireless power transmission apparatus 610.

When the wireless power reception apparatus 620 receives wireless power from the wireless power transmission apparatus 610, a path through which the wireless power reception apparatus 620 receives a power from a battery or an external power source is blocked. In this example, communication between the wireless power transmission apparatus 610 and the wireless power reception apparatus 620 may be performed for the wireless power transmission apparatus 610 to determine a status of the wireless power reception apparatus 620. The communication power may be used for smooth communication with the wireless power transmission apparatus 610 even though the wireless power reception apparatus 620 is unable to receive the power from the battery or the external power source.

The communication power may be supplied at a predetermined interval rather than continuously. By supplying the communication power at the predetermined interval, the amount of energy used may be reduced. The wireless power transmission apparatus 610 may control a power supplied to a resonator to transmit the communication power based at the predetermined interval. When a plurality of wireless power reception apparatuses 620 are provided, the wireless power transmission apparatus 610 may control the predetermined interval to transmit communication powers requested by the wireless power reception apparatuses 620.

The determination of whether the charging power is to be transmitted may be performed based on information received from the wireless power reception apparatus 620. For example, a power status of the wireless power reception apparatus 620 may be checked based on the information on the output of the DC/DC converter. The wireless power transmission apparatus 610 may determine whether the battery of the wireless power reception apparatus 620 is completely charged based on a battery supply voltage of the wireless power reception apparatus 620. When the wireless power transmission apparatus 620 includes a battery charging case, whether the battery is inserted in the battery charging case may be determined based on the battery supply voltage of the wireless power reception apparatus 620. The wireless power transmission apparatus 610 may receive, from the wireless power reception apparatus 620, information regarding whether the wireless power reception apparatus 620 is connected to an external power source, and determine whether the wireless power reception apparatus 620 is connected to an external power source based on the information.

In 650, the wireless power transmission apparatus 610 transmits wireless power to the wireless power reception apparatus 620 based on a result of the determining performed in 640. When it is determined in 640 that the wireless power reception apparatus 620 is connected to the external power source, the wireless power transmission apparatus 610 transmits the communication power to the wireless power reception apparatus 620. When it is determined in 640 that the wireless power reception apparatus 620 is not connected to the external power source and that the battery of the wireless power reception apparatus 620 is completely charged, the wireless power transmission apparatus 610 transmits the communication power to the wireless power reception apparatus 620. When it is determined in 650 that the wireless power reception apparatus 620 is not connected to the external power source and that the battery of the wireless power reception apparatus 620 is not completely charged, the wireless power transmission apparatus 610 transmits the charging power to the wireless power transmission apparatus 620.

Figure 7:
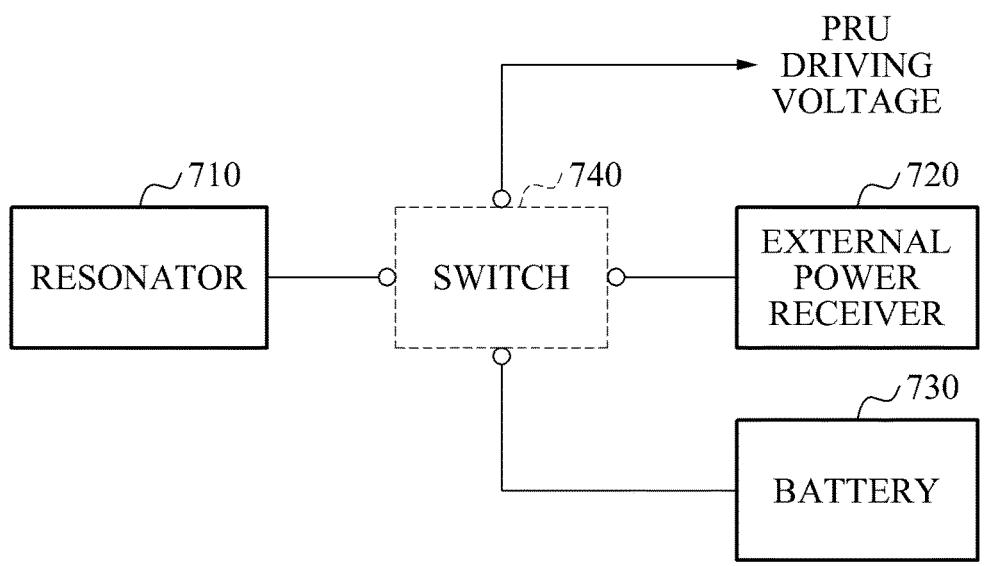
FIG. 7 illustrates an example of a process of supplying a driving voltage to a power receiving unit (PRU).

FIG. 7 illustrates an example of a process of supplying a driving voltage to a PRU.

Referring to FIG. 7, a resonator 710, an external power receiver 720, a battery 730, and a switch 740 of a PRU are illustrated. A PRU driving voltage may be a wireless power received from the resonator 710, an external power received from the external power receiver 720, or battery power received from the battery 730. The wireless power, the external power, and the battery power are supplied to the switch 740. When power is supplied to the PRU through multiple paths, the switch 740 blocks a power supplied to the PRU from a predetermined supply source, and outputs a power supplied to the PRU from another predetermined supply source.

For example, when the PRU is connected to an external power source through the external power receiver, the battery 730 is charged by the external power source, and power supply from the battery 730 to the PRU is blocked. In this example, a communication power may be supplied to the PRU so that a PTU may communicate with the PRU.

In addition, when the battery 730 is completely charged, the power supply from the battery 730 to the PRU is blocked. In this example, a communication power may be supplied to the PRU so that the PTU may communicate with the PRU.

Figure 8:
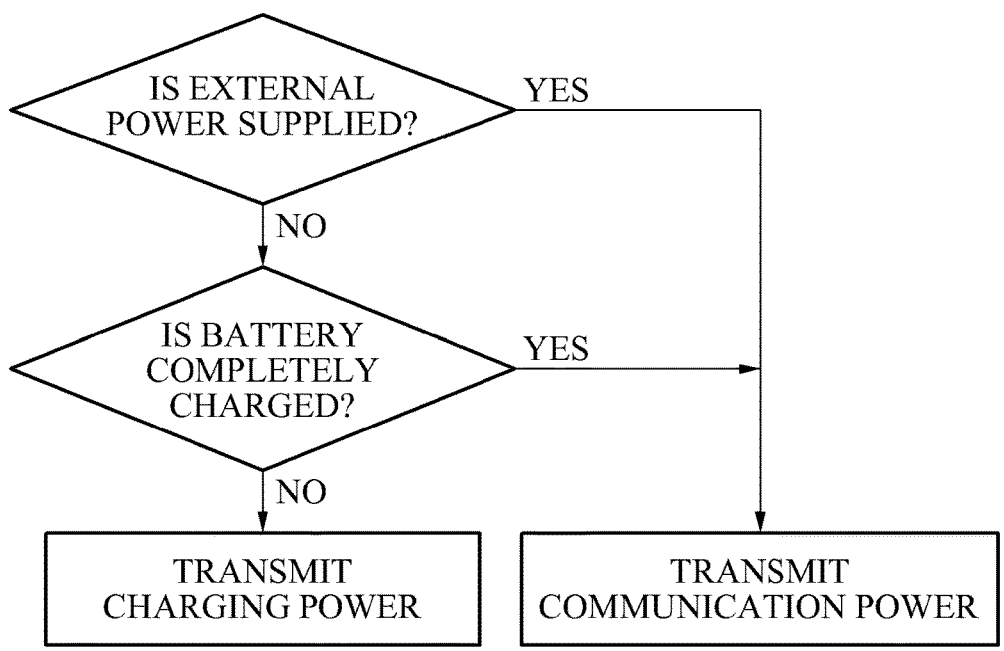
FIG. 8 illustrates an example of a process of determining whether a charging power is to be transmitted to a wireless power reception apparatus.

FIG. 8 illustrates an example of a process of determining whether a charging power is to be transmitted to a wireless power reception apparatus.

The wireless power reception apparatus includes an external power receiver, a battery charger, and a battery. When an external power is supplied to the wireless power reception apparatus through the external power receiver, a wireless power transmission apparatus transmits a communication power to the wireless power reception apparatus. Whether the external power is supplied to the wireless power reception apparatus may be determined based on information regarding whether the wireless power reception apparatus is connected to an external power source. When the wireless power reception apparatus is connected to the external power source, the wireless power transmission apparatus may continually communicate with the wireless power reception apparatus.

When the external power is not supplied to the wireless power reception apparatus, whether a charging power is to be transmitted is determined based on whether the battery of the wireless power reception apparatus is completely charged. When the battery of the wireless power reception apparatus is completely charged, the wireless power transmission apparatus transmits the communication power to the wireless power reception apparatus since a path through which a power is supplied from the battery to the wireless power reception apparatus is blocked as described above in connection with FIG. 7. When the battery of the wireless power reception apparatus is not completely charged, the wireless power transmission apparatus transmits a charging power to the wireless power reception apparatus so that the wireless power reception apparatus may perform charging as well as communication.

Figure 9:
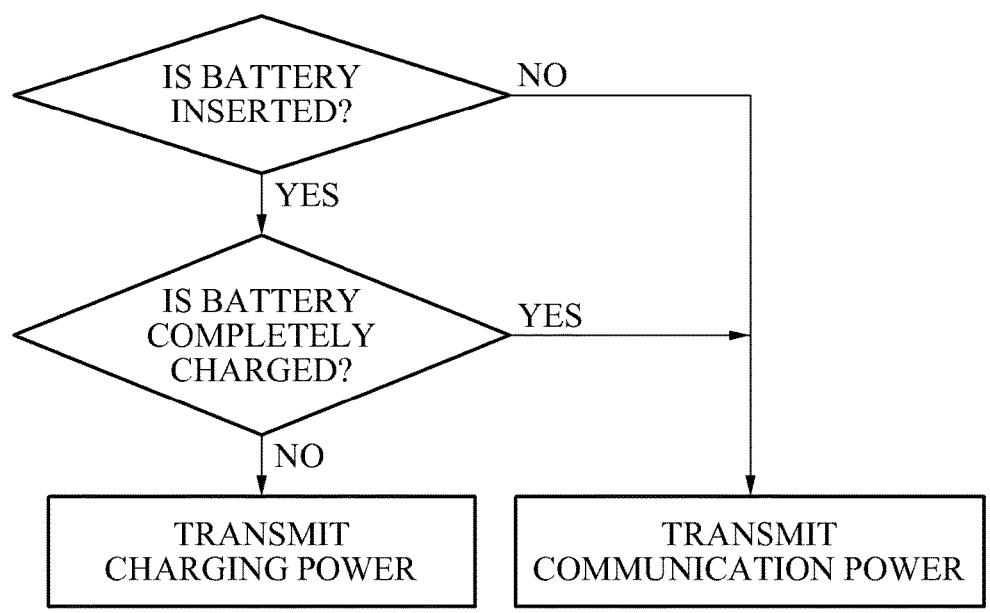
FIG. 9 illustrates an example of a process of determining whether a charging power is to be transmitted to a battery charging case.

FIG. 9 illustrates an example of a process of determining whether a charging power is to be transmitted to a battery charging case.

In this example, a wireless power reception apparatus includes a battery charging case, a battery charger, and a battery, and whether the battery is inserted in the battery charging case and whether the battery is completely charged are determined. A wireless power transmission apparatus receives information on a battery supply voltage from the wireless power reception apparatus, and determines whether the battery is inserted in the battery charging case and whether the battery is completely charged.

When the battery is not inserted in the battery charging case, the wireless power transmission apparatus transmits a communication power to the wireless power reception apparatus since the wireless power transmission apparatus may need to communicate with the wireless power reception apparatus. When the battery is inserted in the battery charging case, whether the battery is completely charged is determined. When the battery is completely charged, the wireless power transmission apparatus transmits a communication power to the wireless power reception apparatus. When the battery is not completely charged, the wireless power transmission apparatus transmits a charging power to the wireless power reception apparatus.

Figure 10:
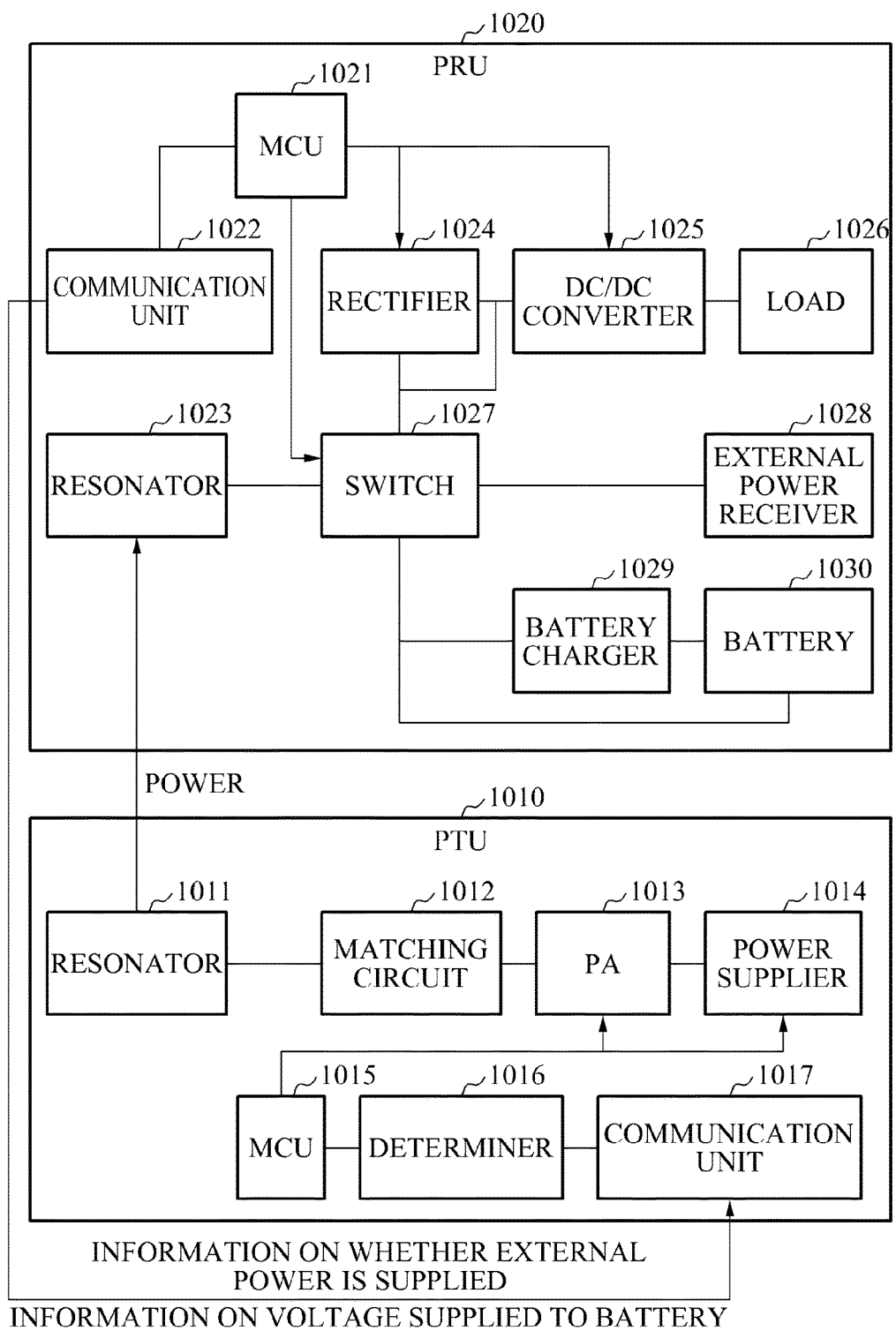
FIG. 10 illustrates an example of an apparatus for transmitting a communication power in a wireless power transmission system.

FIG. 10 illustrates an example of an apparatus for transmitting a communication power in a wireless power transmission system.

Referring to FIG. 10, a PTU 1010 and a PRU 1020 are illustrated. The PTU 1010 includes a resonator 1011, a matching circuit 1012, a PA 1013, a power supplier 1014, an MCU 1015, a determiner 1016, and a communication unit 1017.

The determiner determines a transmission power based on information on an output of a DC/DC converter 1025 of the PRU 1020, information on an operating power of an MCU 1021 of the PRU 1020, information regarding whether an external power is supplied to the PRU 1020 from an external power source, and information on a voltage supplied to a battery 1030 of the PRU 1020. The aforementioned information may be received through the communication unit 1017. The resonator 1011 transmits the determined transmission power to a resonator 1023 of the PRU 1020.

The PRU 1020 includes the MCU 1021, a communication unit 1022, the resonator 1023, a rectifier 1024, the DC/DC converter 1025, a load 1026, a switch 1027, an external power receiver 1028, a battery charger 1029, and the battery 1030.

The communication unit 1022 transmits, to the communication unit 1017 of the PTU 1010, the information on the output of the DC/DC converter 1025, the information on the operating power of the MCU 1021, the information regarding whether the external power is supplied to the PRU 1020 from the external power source, and the information on the voltage supplied to the battery 1030. The information on the output of the DC/DC converter 1025 may be detected at an output end of the DC/DC converter 1025. The information on the operating power of the MCU 1021 may be known in advance based on the specifications of the MCU 1021. The information regarding whether the external power is supplied to the PRU 1020 from the external power source may be detected at an output end of the external power receiver 1028. The information on the voltage supplied to the battery 1030 may be detected at an input end of the battery 1030.

The switch 1027 controls a power supplied to the PRU 1020. The power supplied to the PRU 1020 may be any of a power received through the resonator 1023, a power received through the external power receiver 1028, and a power received through the battery 1030.

The descriptions provided with reference to FIGS. 1, 2A, 2B, 3A, 3B, 4A, 4B, and 5-9 are also applicable to the units shown in FIG. 10, and accordingly duplicated descriptions will be omitted for conciseness.

Figure 11:
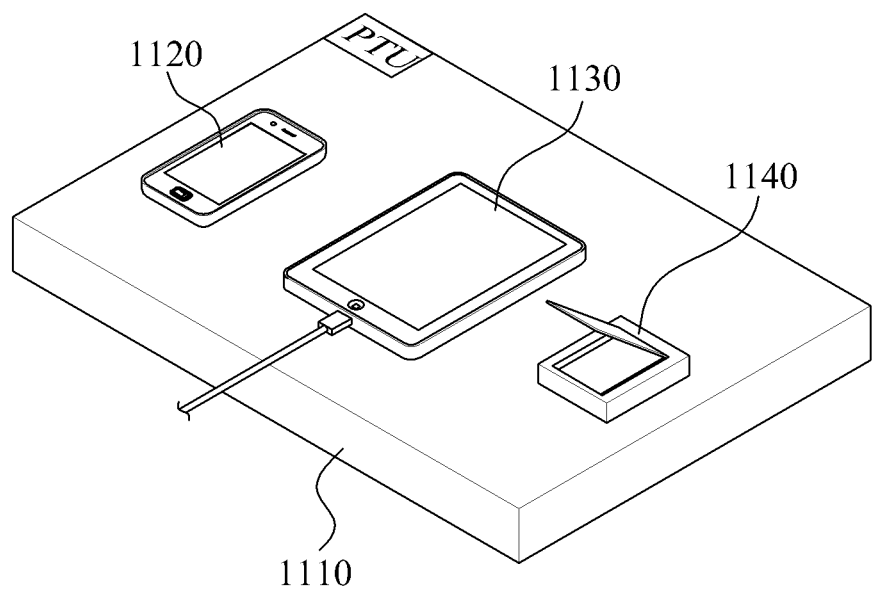
FIG. 11 illustrating an example of a method of transmitting a communication power to multiple targets.

FIG. 11 illustrates an example of a method of transmitting a communication power to multiple targets.

Referring to FIG. 11, a PTU 1110, a smart phone 1120, a tablet PC 1130, and a battery charging case 1140 are illustrated. In this example, the tablet PC 1130 is connected to an external power source, and a battery is not inserted in the battery charging case 1140. The PTU 1110 needs to transmit a power suitable for each PRU when a plurality of PRUs in various statuses are present.

When a power to be used to detect a load to be disposed on the PTU 1110 is supplied to the PTU 1110, the PTU 1110 detects a load. The load detection may be performed by the PTU 1110 by sensing a change in impedance caused by the load. When a load is detected using the power to be used to detect the load, the PTU 1110 performs communication to verify a presence of a PRU. The power to be used for load detection and a power to be used for communication performed with a PRU may be supplied at a predetermined interval.

The PTU 1110 determines whether a communication power is to be supplied or a charging power is to be transmitted based on a status of a PRU disposed on the PTU 1110. When the PRU is completely charged, the PTU 1110 transmits the communication power to the PRU. When the PRU is not completely charged, the PTU 1110 transmits the charging power to the PRU.

When a plurality of PRUs are disposed on the PTU 1110 and each PRU is in a different status, the PTU 1110 may adjust an impedance of the PTU 1110 to transmit powers respectively requested by the plurality of PRUs. For example, a completely charged PRU may have a relatively high impedance, and thus an overvoltage may be applied to the PRU if the PTU 1110 transmits a charging power to the completely charged PRU. Also, if the PTU 1110 transmits a power to the completely charged PRU, there may not be a sufficient power remaining to be supplied to a PRU to be charged. The PTU 1110 may adjust a voltage supplied to the PTU 1110 based on a status of a PRU so that a rectifier output voltage $V_{rect}$ of the PRU may be within an operating range of the PRU. When the voltage supplied to the PTU 1110 is adjusted, impedance matching with the PRU may be achieved, and thus an overvoltage may be prevented from being applied to the PRU.

The Tx controller 114, the communication units 115 and 124, and the Rx controller 125 in FIG. 1 and the MCU 1015, the determiner 1016, the communication unit 1017, the MCU 1021, and the communication unit 1022 in FIG. 10 that perform the various operations described with respect to FIGS. 2A, 2B, 3A, 3B, 4A, 4B, 5-9, and 11 may be implemented using one or more hardware components, one or more software components, or a combination of one or more hardware components and one or more software components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of operating a wireless power transmission apparatus, the method comprising:
   receiving, from a wireless power reception apparatus, information on a battery, wherein the wireless power reception apparatus comprises a battery charging case comprising a battery charger;
   determining, by the wireless power transmission apparatus, whether a battery is inserted in the battery charging case based on the received information on the battery;
   transmitting a communication power and a charging power to the wireless power reception apparatus, in response to the battery being inserted in the battery charging case; and
   transmitting the communication power to the wireless power reception apparatus, in response to the battery not being inserted in the battery charging case.

2. The method of claim 1, wherein the determining comprises:
   determining whether the battery is completely charged by the battery charger based on the received information on the battery.

3. The method of claim 2, wherein the determining of whether the battery is completely charged by the battery charger comprises:
determining that the charging power is not to be transmitted to the wireless power reception in response to a determination that the battery is completely charged by the battery charger.

4. The method of claim 1, further comprising:
receiving, from the wireless power reception apparatus, information regarding whether the wireless power reception apparatus is connected to an external power supply;
determining, by the wireless power transmission apparatus, whether the wireless power reception apparatus is connected to the external power supply based on the received information regarding whether the wireless power reception apparatus is connected to the external power supply; and
determining that the charging power is not to be transmitted to the wireless power reception apparatus in response to a determination that the wireless power reception apparatus is connected to the external power supply.

5. A method of operating a wireless power reception apparatus, the method comprising:
transmitting, to a wireless power transmission apparatus, information on a battery supply voltage, wherein the wireless power reception apparatus comprises a battery charging case comprising a battery charger;
receiving a communication power and a charging power from the wireless power transmission apparatus, in response to the battery being inserted in the battery charging case; and
receiving the communication power from the wireless power transmission apparatus, in response to the battery not being inserted in the battery charging case.

6. The method of claim 5, wherein the charging power is transmitted by the wireless power transmission apparatus in response to a result of further determining, by the wireless power transmission apparatus, whether the battery is completely charged by the battery charger based on the information on the battery.

7. The method of claim 6, wherein the charging power is not to be transmitted to the wireless power reception in response to a determination that the battery is completely charged by the battery charger.

8. The method of claim 5, further comprising:
transmitting, to a wireless power transmission apparatus, information regarding whether the wireless power reception apparatus is connected to an external power supply, and
wherein the charging power is transmitted by the wireless power transmission apparatus in response to a result of further determining, by the wireless power transmission apparatus, whether the wireless power reception apparatus is connected to the external power supply based on the information regarding whether the wireless power reception apparatus is connected to the external power supply, and
wherein the charging power is not to be transmitted to the wireless power reception apparatus in response to a determination that the wireless power reception apparatus is connected to the external power supply.

9. The method of claim 5, wherein whether battery is inserted or not is determined by the wireless power transmission apparatus based on the information on the battery.

* * * * *